United States Patent
Hofland et al.

(10) Patent No.: US 7,206,164 B2
(45) Date of Patent: Apr. 17, 2007

(54) ADHESIVE SHEET SHAFT SUPPORT IN A DATA STORAGE DEVICE

(75) Inventors: Jonathan Hofland, Longmont, CO (US); Marc Jacques Lalouette, Boulder, CO (US); Tracy Kint Thede, Brighton, CO (US); Thomas John Konetski, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 305 days.

(21) Appl. No.: 10/462,522

(22) Filed: Jun. 16, 2003

(65) Prior Publication Data

US 2004/0066572 A1 Apr. 8, 2004

Related U.S. Application Data

(60) Provisional application No. 60/415,877, filed on Oct. 3, 2002.

(51) Int. Cl.
*G11B 25/04* (2006.01)

(52) U.S. Cl. .................................. 360/97.01

(58) Field of Classification Search ............. 360/97.01, 360/97.02, 99.12; 369/95.11, 263.1
See application file for complete search history.

(56) References Cited

U.S. PATENT DOCUMENTS

| | | | |
|---|---|---|---|
| 3,658,635 A | | 4/1972 | Eustice |
| 4,797,762 A | * | 1/1989 | Levy et al. ............... 360/99.06 |
| 5,097,164 A | * | 3/1992 | Nakasugi et al. ............. 310/88 |
| 5,214,549 A | | 5/1993 | Baker et al. |
| 5,231,557 A | * | 7/1993 | Ogawa et al. ........... 360/254.2 |
| 5,282,100 A | * | 1/1994 | Tacklind et al. .......... 360/97.02 |
| 5,303,101 A | * | 4/1994 | Hatch et al. ................. 360/256 |
| 5,517,375 A | | 5/1996 | Dion et al. |
| 5,760,509 A | * | 6/1998 | Chung .......................... 310/90 |
| 5,781,373 A | | 7/1998 | Larson et al. |
| 5,825,585 A | | 10/1998 | Hatam-Tabrizi |
| 5,898,537 A | * | 4/1999 | Oizumi et al. ........... 360/97.01 |
| 6,177,173 B1 | * | 1/2001 | Nelson ....................... 428/137 |
| 6,205,004 B1 | * | 3/2001 | Kim ......................... 360/264.1 |
| 6,229,668 B1 | | 5/2001 | Huynh et al. |
| 6,266,207 B1 | | 7/2001 | Iwahara et al. |
| 6,377,420 B1 | | 4/2002 | Tadepalli et al. |
| 6,400,524 B1 | * | 6/2002 | Morris et al. ............ 360/97.01 |
| 6,466,400 B1 | * | 10/2002 | Iwahara et al. .......... 360/99.08 |
| 6,469,864 B2 | * | 10/2002 | Kamezawa et al. ...... 360/97.01 |
| 6,498,700 B2 | * | 12/2002 | Takahashi et al. ....... 360/97.01 |
| 6,504,672 B1 | * | 1/2003 | Janik et al. ............... 360/97.02 |
| 6,697,213 B2 | * | 2/2004 | Lofstrom et al. ........ 360/97.01 |
| 6,721,128 B1 | * | 4/2004 | Koizumi et al. ......... 360/97.02 |
| 6,837,622 B2 | * | 1/2005 | Gomyo et al. .............. 384/100 |
| 6,950,275 B1 | * | 9/2005 | Ali et al. .................. 360/97.02 |
| 2003/0048576 A1 | * | 3/2003 | Sohn et al. .............. 360/99.08 |

* cited by examiner

*Primary Examiner*—Angel Castro
(74) *Attorney, Agent, or Firm*—Derek J. Berger

(57) ABSTRACT

An actuator pivot assembly in a data storage device includes a base, a cover attached to the base, and a shaft mounted on the base and extending upward into a hole defined by the cover. A sheet on top of the cover spans the hole, and an adhesive layer beneath the sheet adheres the sheet to the cover and to the shaft, thereby securing the actuator shaft to the cover, damping vibrations in the actuator pivot assembly, and sealing the hole defined by the cover. These functions are performed while saving space, reducing costs and simplifying assembly of the data storage device.

20 Claims, 3 Drawing Sheets

ADHESIVE SHEET SHAFT SUPPORT IN A DATA STORAGE DEVICE

RELATED APPLICATIONS

This application claims priority of U.S. provisional application Ser. No. 60/415,877, filed Oct. 3, 2002.

FIELD OF THE INVENTION

This application relates generally to data storage devices and more particularly to an adhesive shaft support in a data storage device.

BACKGROUND OF THE INVENTION

A typical disc drive or similar data storage device includes a base to which various structural components of the disc drive are mounted. A top cover cooperates with the base to form an internal environment for the disc drive. The structural components include a spindle motor, which rotates one or more discs at a constant high speed. Information is written to and read from tracks on the discs through the use of an actuator assembly, which rotates during a seek operation about a shaft positioned adjacent the discs.

The actuator shaft is typically mounted on the base, and is attached to the cover by a screw. The screw attachment typically provides sufficient mechanical support for the shaft, but does not dampen undesirable vibrations resulting from movement of the actuator assembly and from other sources, such as external shocks and vibrations. The screw attachment also adds to the cost and complexity of assembling the disc drive. Additionally, the screw attachment takes up valuable space in the disc drive, often requiring the height of the disc drive to be increased to accommodate the screw and the corresponding structural features.

Accordingly there is a need for an attachment of a shaft to a disc drive cover that dampens vibrations, takes up minimal space, and that is simple and inexpensive. The present invention provides a solution to this and other problems, and offers other advantages over the prior art.

SUMMARY OF THE INVENTION

Against this backdrop the present invention has been developed. An embodiment of the present invention is a data storage device having a base and a cover attached to the base. A shaft is mounted on the base and extends upward into a hole defined by the cover. A sheet on top of the cover spans the hole and is adhered to both the cover and the shaft.

An embodiment of the present invention may be described in another way as an actuator pivot assembly in a disc drive. The assembly includes a base, a cover attached to the base, and a shaft mounted on the base and extending upward into a hole defined by the cover. A sheet on top of the cover spans the hole, and an adhesive layer beneath the sheet adheres the sheet to the cover and to the shaft, thereby securing the actuator shaft to the cover, damping vibrations in the actuator pivot assembly, and sealing the hole defined by the cover. These functions are performed while saving space, reducing costs, and simplifying assembly of the disc drive.

These and various other features as well as advantages which characterize the present invention will be apparent from a reading of the following detailed description and a review of the associated drawings.

DETAILED DESCRIPTION

Figure 1:
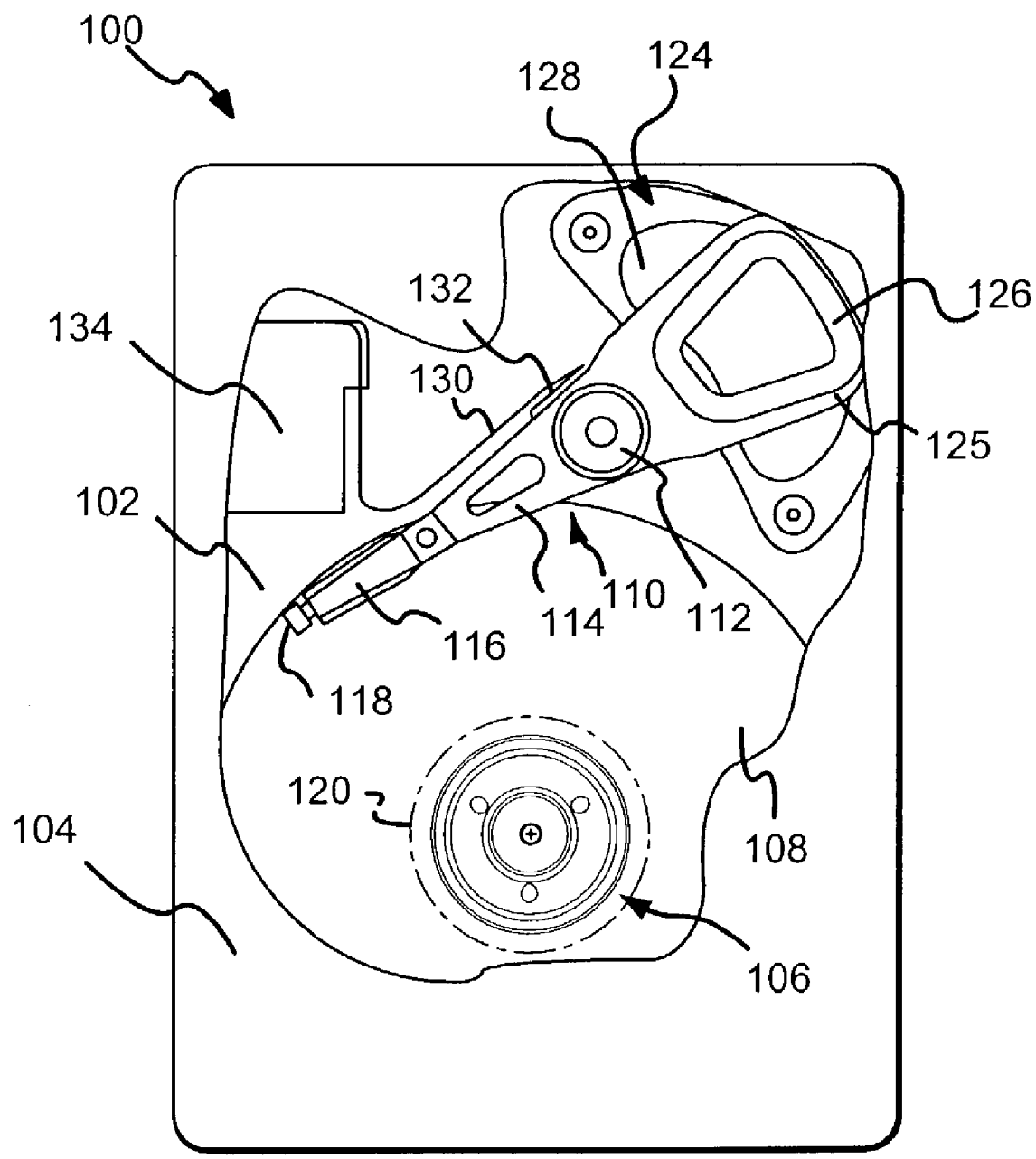
FIG. 1 is a plan view of a disc drive incorporating a preferred embodiment of the present invention with the top cover shown partially cut away to reveal the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114, which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a yoke 125 supporting a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. In other embodiments, the heads 118 are moved over ramps (not shown) at the outer diameter of the discs 108. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires or similar circuitry (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 3:
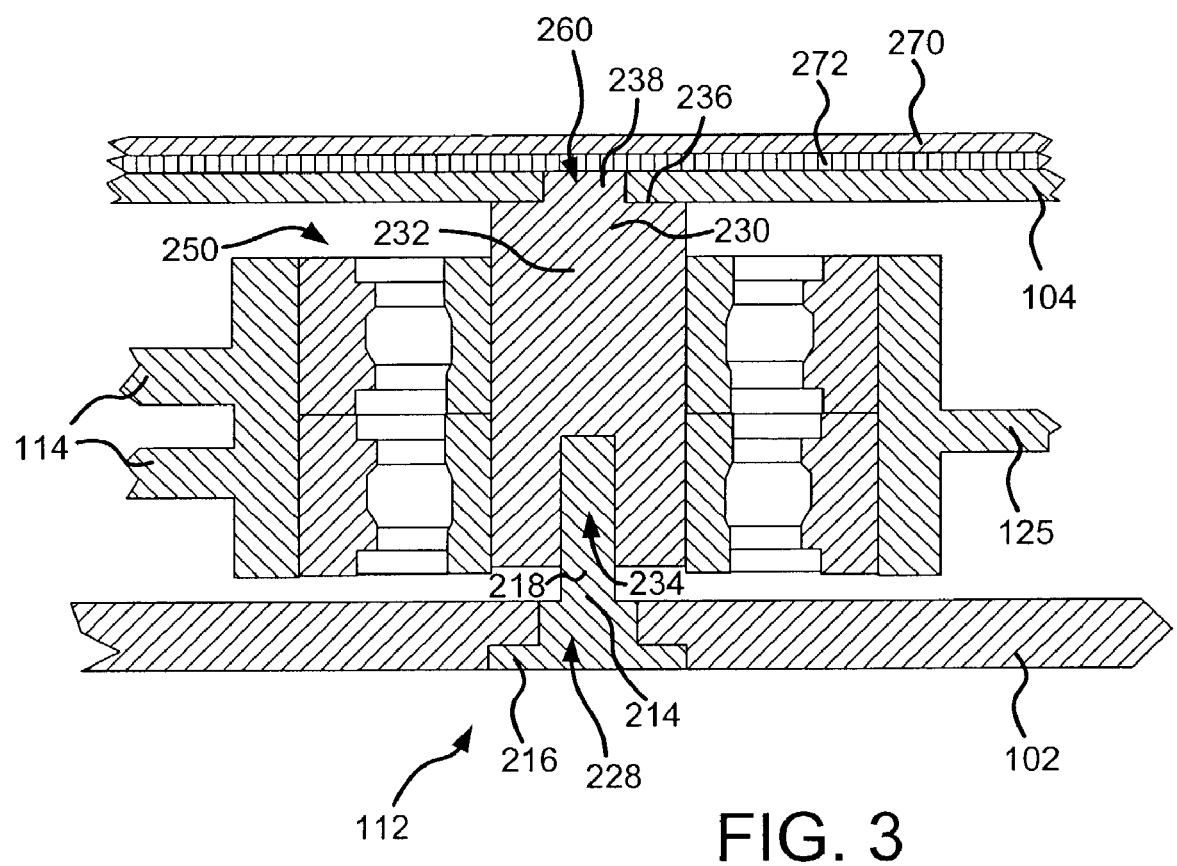
FIG. 3 is a sectional view taken along line 3—3 of FIG. 2.

Referring now to FIG. 3, the bearing shaft assembly 112 includes a threaded stud 214 that protrudes upward from the base 102. In a preferred embodiment, the stud 214 is a self-clinching stud with a head 216 and a shank 218. The head 216 is pressed into a hole 228 in the base 102 so that the shank 218 protrudes up from the base 102 to support the actuator shaft 230. The actuator shaft 230 preferably includes a cylindrical body 232 having an upwardly extending threaded hole 234 that receives the shank 218 of the threaded stud 214 to mount the actuator shaft 230 on the base 102. Notably, the actuator shaft 230 may be mounted on the base in some other manner. For example, the threaded stud 214 could be integrally formed with the base 102. The top of the actuator shaft 230 forms an annular shoulder 236 extending around an upwardly protruding cylindrical nub 238. The shoulder 236 and the nub 238 assist in securing the top of the actuator shaft 230 to the top cover 104, as discussed below.

A pair of bearings 250 is mounted on the actuator shaft 230. The bearings 250 support the yoke 125 on one side and the actuator arms 114 on the opposite side, thus allowing the actuator arms 114 and the yoke 125 to rotate or pivot around the actuator shaft 230.

Figure 2:
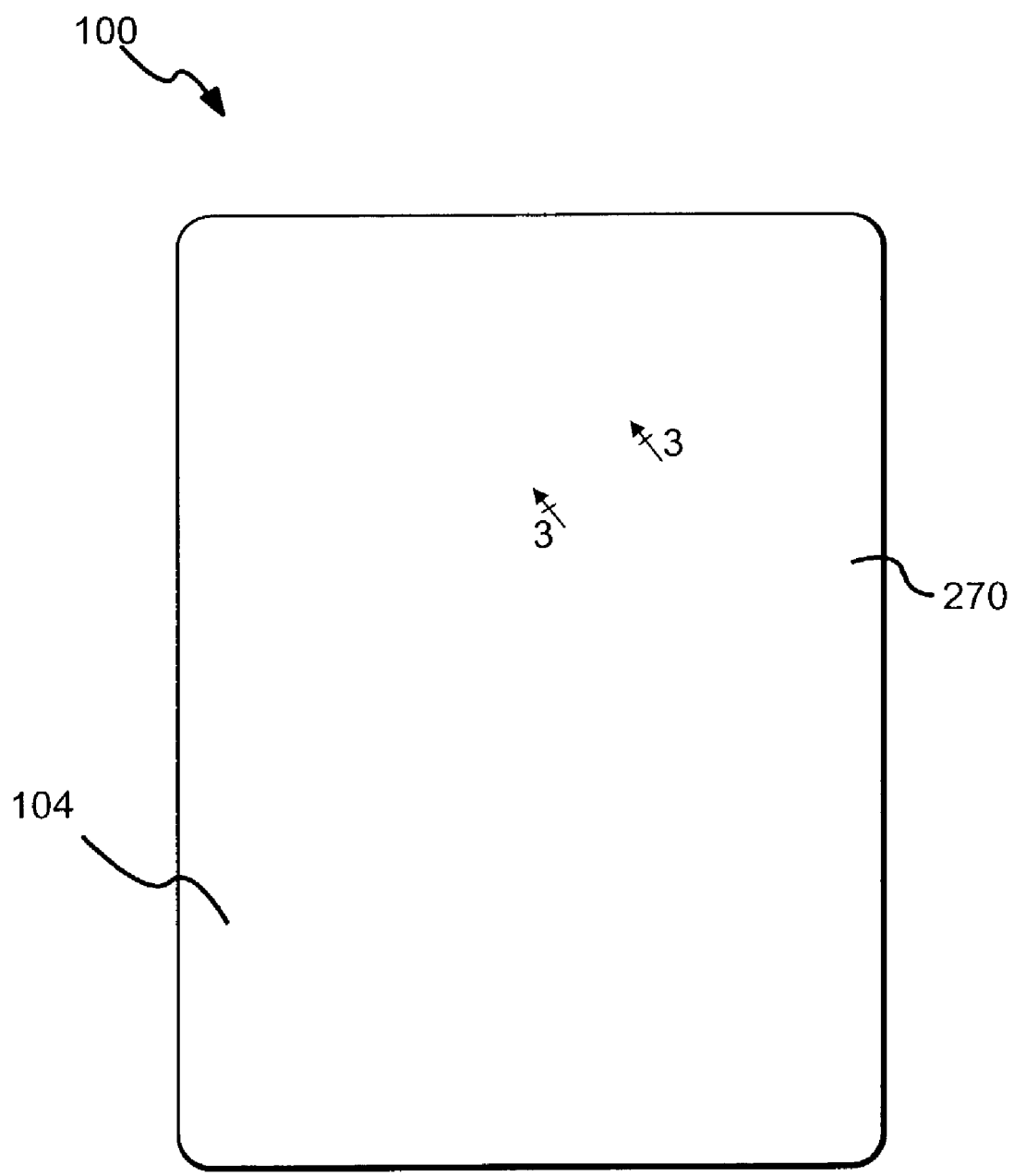
FIG. 2 is a plan view of the disc drive of FIG. 1, with the top cover not being cut away.

Still referring to FIG. 3, the top cover 104 has a hole 260 that receives the nub 238 in a location fit. The top of the nub 238 is preferably flush with the top surface of the cover 104. As shown in FIGS. 2–3, a sheet 270, which is preferably a disc drive label, covers the top of the cover 104 and covers the hole 260 and the nub 238. While the sheet 270 is shown as covering the entire cover 104, the sheet 270 may cover only a portion of the cover 104. A layer of adhesive 272 is located between the sheet 270 and the top of the cover 104, as well as between the sheet 270 and the nub 238. Because the sheet 270 is adhered to the cover 104 and to the nub 238 on the top of the actuator shaft 230, the sheet 270 secures the top of the actuator shaft 230 to the top cover 104 without requiring an additional mechanical fastener, such as a screw. Thus the design shown saves space and avoids costs by eliminating the need for an additional mechanical fastener to secure the top of the actuator shaft 230 to the top cover 104. The sheet 270 and the adhesive layer 272 also preferably seal the hole 260 to maintain the internal sealed environment discussed above.

The sheet 270 is preferably a material that is sufficiently thin and flexible to effectively act as a disc drive label, but that is sufficiently strong and stiff to effectively secure the top of the actuator shaft 230 to the top cover 104. The sheet 270 may be a metallized polymer, such as a metallized polymer sold under the trademark MYLAR by E.I. Du Pont de Nemours and Co. of Wilmington, Del.

The adhesive 272 is preferably an adhesive that is sufficiently strong to secure the top of the actuator shaft 230 to the cover 104 and to seal the hole 260. The adhesive 272 preferably also has good damping properties to dampen vibrations in the bearing shaft assembly 112, and thus in the actuator assembly 110. In a preferred embodiment, the adhesive 272 is a pressure sensitive viscoelastic adhesive, such as the pressure sensitive viscoelastic adhesive available from Minnesota Mining and Manufacturing Company of St. Paul, Minn. under product number 242F01.

The embodiment of the present invention described above thus secures the top of the actuator shaft 230 to the top cover 104, while damping vibrations, reducing costs, simplifying assembly, saving space, and maintaining the sealed environment of the disc drive.

An embodiment of the present invention may be summarized as a data storage device (such as 100) having a base (such as 102) and a cover (such as 104) attached to the base. A shaft (such as 230) is mounted on the base and extends upward into a hole (such as 260) defined by the cover. A sheet (such as 270) on top of the cover spans the hole and is adhered to both the cover and the shaft.

The sheet may be adhered to the cover by a layer of adhesive (such as 272) that includes a viscoelastic material. The shaft may have a shoulder (such as 236) and a nub (such as 238) extending up from the shoulder, the shoulder abutting the cover and the nub extending into the hole, such that the nub mates with the hole in a location fit. The sheet may be a disc drive label that includes a metallized polymer material.

An embodiment of the present invention may be alternatively described as an actuator pivot assembly (such as 110) in a disc drive (such as 100). The assembly includes a base (such as 102), a cover (such as 104) attached to the base, and a shaft (such as 230) mounted on the base and extending upward into a hole (such as 260) defined by the cover. A sheet (such as 270) on top of the cover spans the hole, and an adhesive layer (such as 272) beneath the sheet adheres the sheet to the cover and to the shaft, thereby securing the actuator shaft to the cover, damping vibrations in the actuator pivot assembly, and sealing the hole defined by the cover. The assembly also includes an actuator arm (such as 114) pivotally mounted on the shaft.

An embodiment of the present invention may be alternatively described as a disc drive (such as 100) that includes a base (such as 102) supporting a rotatable data storage disc (such as 108) and a cover (such as 104) attached to the base to form an enclosed space. A shaft (such as 230) is mounted on the base and extends upward into a hole (such as 260) defined by the cover. A disc drive label (such as 270) on top of the cover spans the hole, and an adhesive layer (such as 272) beneath the label adheres the label to the cover and to the shaft. An actuator arm (such as 114) mounted on the shaft is operable to pivot about the shaft to move a head (such as 118) over a data surface of the disc.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the present invention can be used in conjunction with other data storage devices, such as optical data storage devices, and with other shafts, such as spindle motor shafts. Numerous other changes may be made which will readily suggest themselves to those skilled in the art and which are encompassed in the spirit of the invention disclosed and as defined in the appended claims.

What is claimed is:

1. A data storage device comprising:
   a base;
   a cover attached to the base;
   a shalt mounted on the base and extending upward into a hole defined by the cover; and
   a sheet on top of the cover spanning the hole, the sheet adhered to the cover and to the shaft.

2. The device of claim 1, wherein the sheet is adhered to the cover by a layer of adhesive.

3. The device of claim 2, wherein the layer of adhesive comprises a viscoelastic material.

4. The device of claim 1, wherein the shaft comprises a shoulder and a nub extending up from the shoulder, the shoulder abutting the cover and the nub extending into the hole.

5. The device of claim 4, wherein the nub mates with the hole in a location fit.

6. The device of claim 1, further comprising an actuator arm pivotaUy mounted on the shaft.

7. The device of claim 1, wherein the sheet is a disc drive label.

8. The device of claim 7, wherein the disc drive label comprises a polymer material.

9. The device of claim 8, wherein the polymer material is metallized.

10. The device of claim 1, further comprising an aduator arm that is operable to pivot about the shaft to move the head over a rotatable disc that is mounted on the base adjacent to the shaft.

11. An actuator pivot assembly in a disc drive, the assembly comprising:
a base;
a cover attached to the base;
a shaft mounted on the base and extending upward into a hole defined by the cover;
a sheet on top of the cover, the sheet spanning the hole;
an adhesive layer beneath the sheet adhering the sheet to the cover and to the shaft, thereby securing the actuator shaft to the cover, damping vibrations in the actuator pivot assembly, and sealing the hole defined by the cover; and
an actuator arm pivotally mounted on the shaft.

12. The assembly of claim 11, wherein the adhesive layer comprises a viscoelastic adhesive material.

13. The assembly of claim 11, wherein the shaft comprises a shoulder and a nub extending up from the shoulder, the shoulder abutting the cover and the nub extending into the hole in a location fit.

14. The assembly of claim 11, wherein the sheet is a disc drive label.

15. The assembly of claim 11, wherein the sheet comprises a polymer material.

16. The assembly of claim 15, wherein the polymer material is metallized.

17. A disc drive comprising:
a base supporting a rotatable data storage disc;
a cover attached to the base to form an enclosed space;
a shaft mounted on the base and extending upward into a hole defined by the cover;
a disc drive label on top of the cover, the label spanning the hole;
an adhesive layer beneath the label adhering the label to the cover and to the shaft; and
an actuator arm mounted on the shaft, the actuator arm operable to pivot about the shaft to move a head over a data surface of the disc.

18. The disc drive of claim 17, wherein the adhesive layer comprises a viscoelastic adhesive material.

19. The disc drive of claim 17, wherein the shaft comprises a shoulder and a nub extending up from the shoulder, the shoulder abutting the cover and the nub extending into the bole in a location fit.

20. The disc drive of claim 17, wherein the label comprises a metallized polymer material.

* * * * *